(12) United States Patent
Bussa et al.

(10) Patent No.: US 7,966,521 B2
(45) Date of Patent: Jun. 21, 2011

(54) LIGHT WEIGHT AND HIGH THROUGHPUT TEST CASE GENERATION METHODOLOGY FOR TESTING CACHE/TLB INTERVENTION AND DIAGNOSTICS

(75) Inventors: Vinod Bussa, Hi-tech (IN); Manoj Dusanapudi, Bangalore (IN); Sunil Suresh Hatti, Gokul (IN); Shakti Kapoor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 12/172,595

(22) Filed: Jul. 14, 2008

(65) Prior Publication Data

US 2010/0011248 A1 Jan. 14, 2010

(51) Int. Cl.
*G06F 11/00* (2006.01)
(52) U.S. Cl. ............................. 714/25; 714/35
(58) Field of Classification Search ...... 714/25
See application file for complete search history.

(56) References Cited

U.S. PATENT DOCUMENTS

| | | | | |
|---|---|---|---|---|
| 4,357,656 A * | 11/1982 | Saltz et al. | | 711/138 |
| 4,800,486 A * | 1/1989 | Horst et al. | | 714/25 |
| 5,068,783 A * | 11/1991 | Tanagawa et al. | | 714/27 |
| 5,488,573 A * | 1/1996 | Brown et al. | | 703/21 |
| 6,006,028 A * | 12/1999 | Aharon et al. | | 703/21 |
| 6,182,246 B1 * | 1/2001 | Gregory et al. | | 714/38 |
| 6,560,721 B1 * | 5/2003 | Boardman et al. | | 714/33 |
| 6,684,359 B2 * | 1/2004 | Noy | | 714/741 |
| 6,871,298 B1 * | 3/2005 | Cavanaugh et al. | | 714/33 |
| 6,966,017 B2 * | 11/2005 | Evans | | 714/718 |
| 7,010,734 B2 * | 3/2006 | Brahme et al. | | 714/724 |
| 7,133,816 B2 * | 11/2006 | Adir et al. | | 703/14 |
| 7,222,179 B2 * | 5/2007 | Srivastava et al. | | 709/226 |
| 7,240,243 B2 * | 7/2007 | Decker | | 714/33 |
| 7,457,989 B2 * | 11/2008 | Ulrich et al. | | 714/38 |
| 7,590,973 B1 * | 9/2009 | Barry et al. | | 717/126 |
| 7,669,083 B2 * | 2/2010 | Arora et al. | | 714/25 |
| 7,752,499 B2 * | 7/2010 | Choudhury et al. | | 714/25 |
| 7,836,343 B2 * | 11/2010 | Feng et al. | | 714/32 |
| 2004/0078699 A1 * | 4/2004 | Thompson et al. | | 714/42 |
| 2004/0123185 A1 * | 6/2004 | Pierce et al. | | 714/38 |
| 2006/0015689 A1 * | 1/2006 | Okawa et al. | | 711/143 |
| 2007/0168733 A1 * | 7/2007 | Devins et al. | | 714/33 |
| 2008/0141080 A1 * | 6/2008 | Bohizic et al. | | 714/701 |
| 2008/0141084 A1 * | 6/2008 | Bohizic et al. | | 714/724 |
| 2008/0216076 A1 * | 9/2008 | Udell et al. | | 718/100 |
| 2008/0288834 A1 * | 11/2008 | Manovit et al. | | 714/718 |
| 2008/0320352 A1 * | 12/2008 | Udell et al. | | 714/739 |
| 2009/0070631 A1 * | 3/2009 | Arora et al. | | 714/38 |
| 2009/0070632 A1 * | 3/2009 | Bag et al. | | 714/42 |
| 2009/0222647 A1 * | 9/2009 | Feng et al. | | 712/227 |

* cited by examiner

*Primary Examiner* — Scott T Baderman
*Assistant Examiner* — Kamini Patel
(74) *Attorney, Agent, or Firm* — VanLeeuwen & VanLeeuwen; Matthew B. Talpis

(57) ABSTRACT

A test case manager selects a first test case and a second test case from a plurality of test cases. The test case manager provides the first test case to a first processor and provides the second test case to a second processor. As such, the first processor executes the first test case and the second processor executes the second test case. After the execution, the test case manager loads the first test case onto the second processor and loads the second test case onto the first processor. In turn, the first processor executes the second test case and the second processor executes the first test case.

20 Claims, 9 Drawing Sheets

|  | Processor A | Processor B | Processor C |
|---|---|---|---|
| Round 1 | Test Case 1 | Test Case 2 | Test Case 3 |
| Round 2 | Test Case 2 | Test Case 3 | Test Case 1 |
| Round 3 | Test Case 3 | Test Case 1 | Test Case 2 |

*FIG. 6*

LIGHT WEIGHT AND HIGH THROUGHPUT TEST CASE GENERATION METHODOLOGY FOR TESTING CACHE/TLB INTERVENTION AND DIAGNOSTICS

BACKGROUND OF THE INVENTION

1. Technical Field

The present invention relates to a light weight and high throughput test case methodology. More particularly, the present invention relates to swapping test cases between homogeneous processors in order to effectively test the processors utilizing a reduced set of test cases.

2. Description of the Related Art

Processor testing tools exist whose goal is to generate the most stressful test case for a processor. In theory, the generated test case should provide maximum test coverage and should be interesting enough to stress various timing scenarios on the processor. The whole technology of these tools sits in the logic of building these test cases.

Verifying and validating a processor using test cases typically includes three stages, which are 1) test pattern build stage, 2) test pattern execution stage, and 3) validation and verification stage. The invention described herein pertains to utilizing a reduced set of test cases during the test pattern execution stage.

SUMMARY

A test case manager selects a first test case and a second test case from a plurality of test cases. The test case manager provides the first test case to a first processor and provides the second test case to a second processor. In turn, the first processor executes the first test case and the second processor executes the second test case. After the execution, the test case manager loads the first test case onto the second processor and loads the second test case onto the first processor, whereupon the first processor executes the second test case and the second processor executes the first test case.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 6 is a table showing a round robin approach to swap test cases between processors;

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
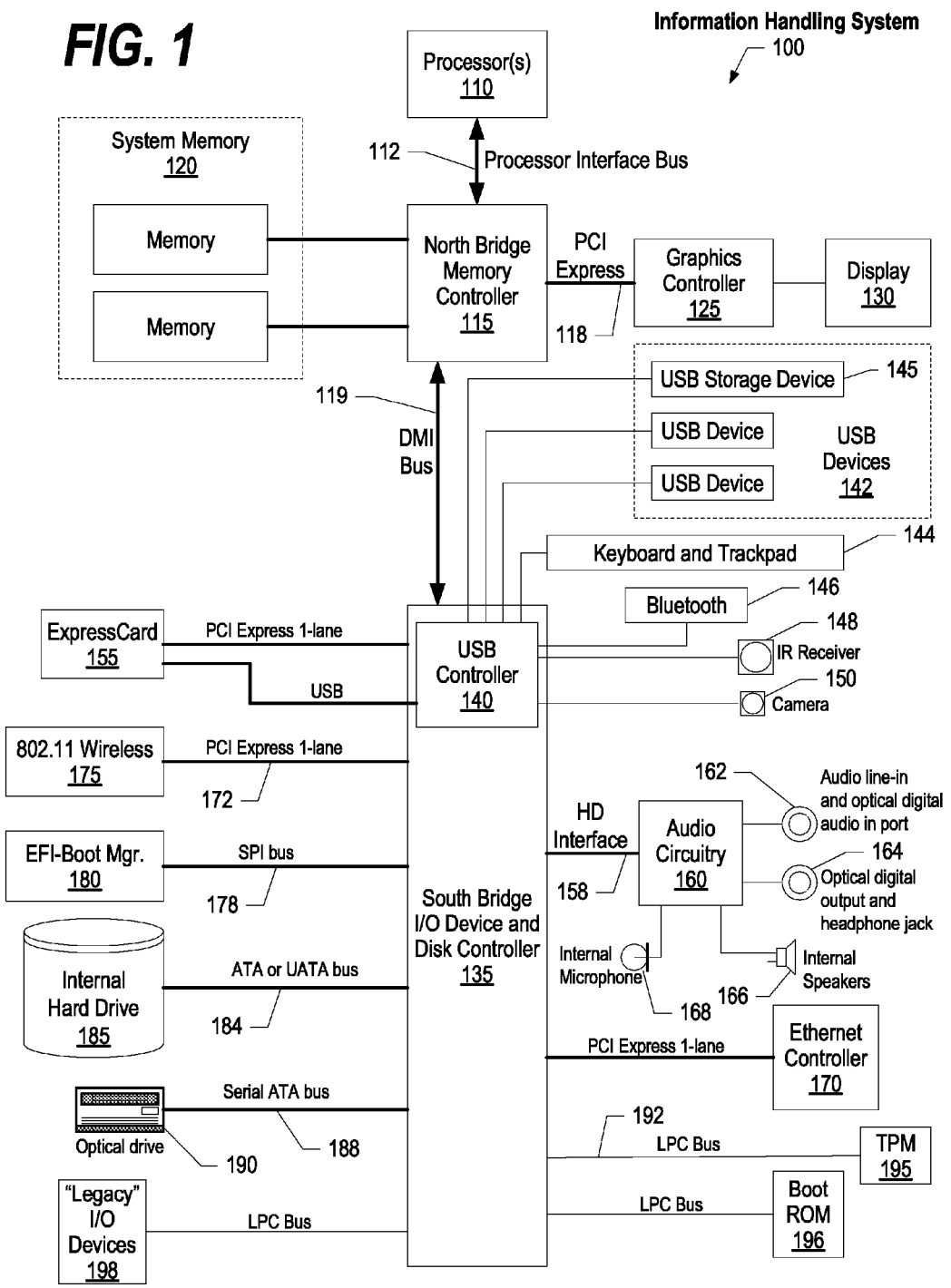
FIG. 1 is a block diagram of a data processing system in which the methods described herein can be implemented.
Figure 2:
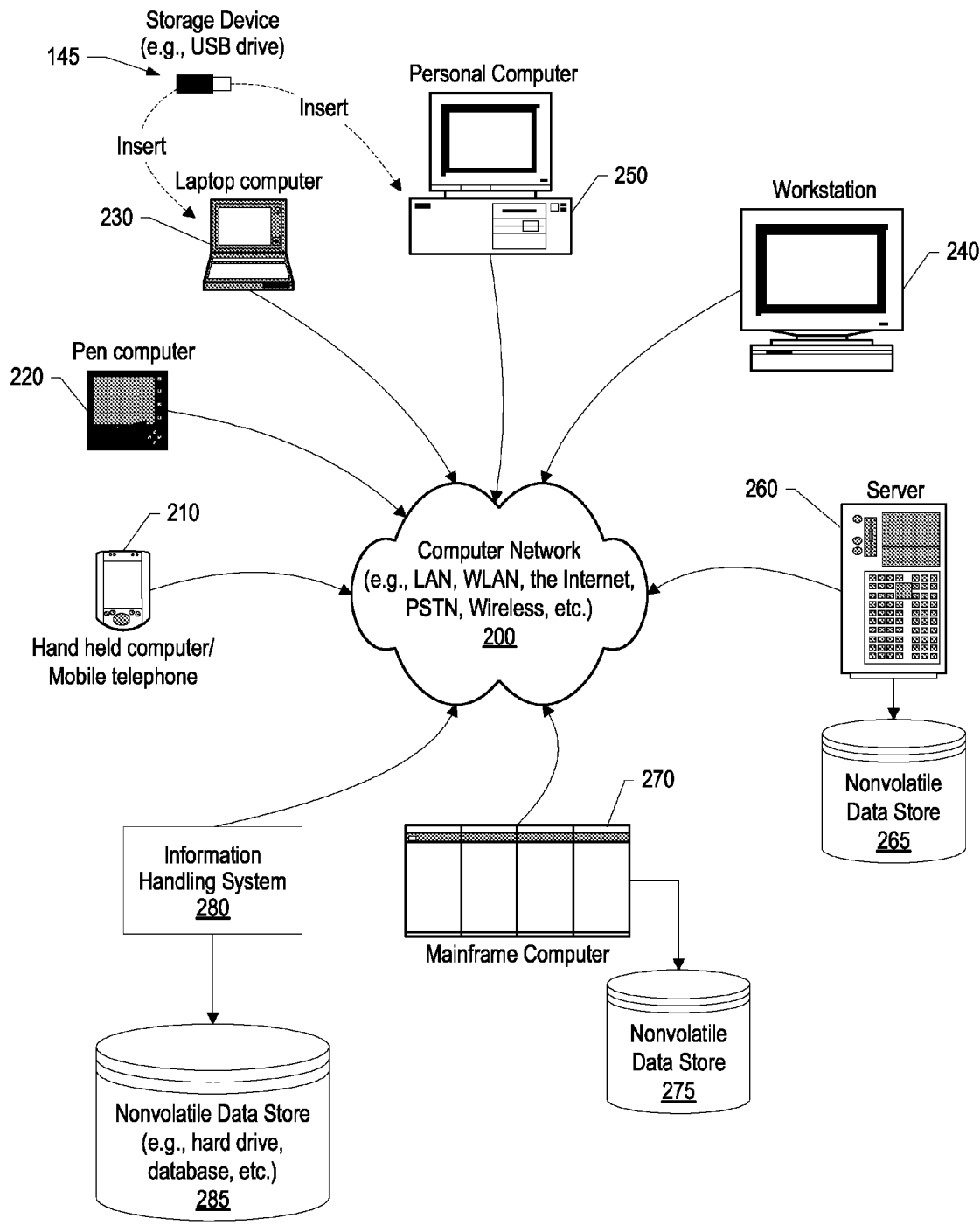
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
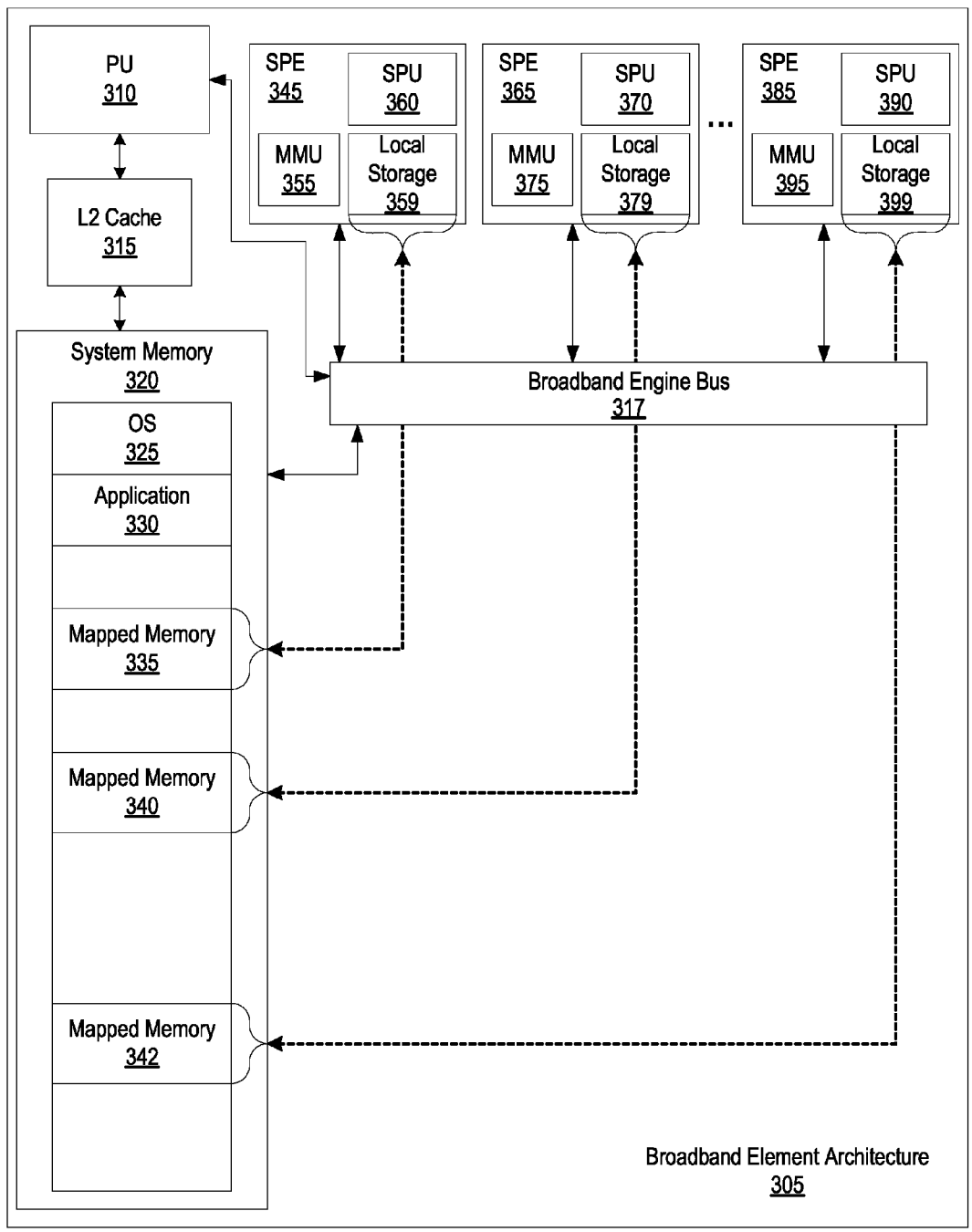
FIG. 3 is a block diagram illustrating a processing element having a main processor and a plurality of secondary processors sharing a system memory.

FIG. 3 is a block diagram illustrating a processing element having a main processor and a plurality of secondary processors sharing a system memory. Broadband Element Architecture (BEA) 305 includes processing unit (PU) 310, which, in one embodiment, acts as the main processor and runs the operating system. Processing unit 310 may be, for example, a Power PC core executing a Linux operating system. BEA 305 also includes a plurality of synergistic processing elements (SPEs) such as SPEs 345 through 385. Each SPE includes a synergistic processing unit (SPU) that act as secondary processing units to PU 310, a memory storage unit, and local storage. For example, SPE 345 includes SPU 360, MMU 355, and local storage 359; SPE 365 includes SPU 370, MMU 375, and local storage 379; and SPE 385 includes SPU 390, MMU 395, and local storage 399.

In one embodiment, the SPEs process data under the control of PU 310. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 310 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 305 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 310 as well as by the other SPEs by mapping each shared region to system memory 320. In one embodiment, PU 310 manages the memory map for the common system memory 320. The memory map table may include PU 310's L2 Cache 315, system memory 320, as well as the SPEs' shared local stores.

A portion of system memory 320 as shown is occupied by the operating system (OS 325). System Memory 325 also contains data 340, which represents data to be processed by SPU 310 as well as by the SPEs. In one embodiment, a process executing on the PU receives a request for a task involving the processing of large data. The PU first determines an optimum method for performing the task as well as an optimum placement of the data in common system memory 320. The PU may then initiate a transfer of the data to be processed from disk 335 to system memory 320. In one embodiment, the PU arranges the data in system memory 325 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 320. This procedure may be repeated as SPEs become available until all the data blocks have been processed.

Figure 4:
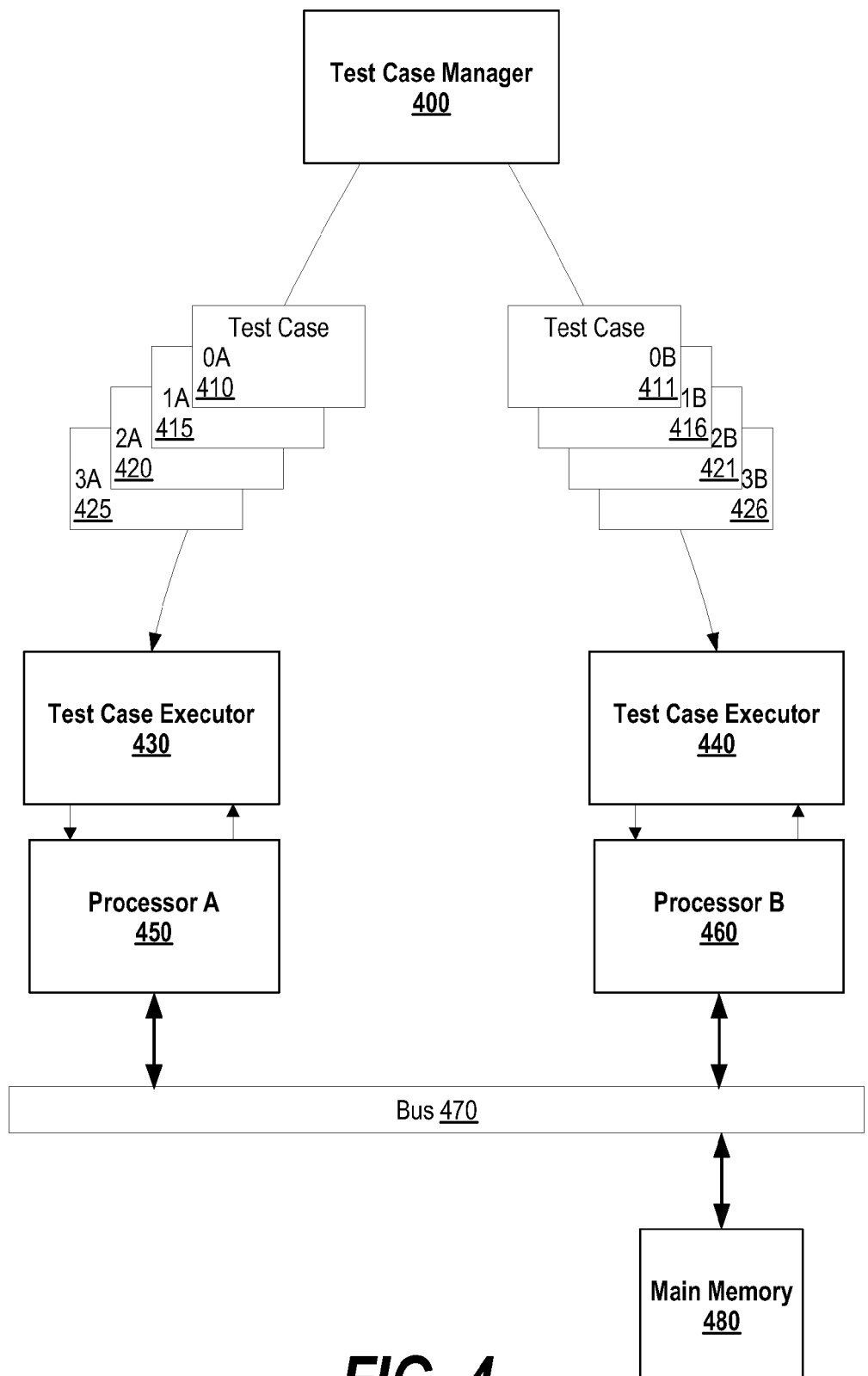
FIG. 4 is a diagram showing a test case manager providing "n" test cases to a plurality of test case executors that execute on separate processors.

FIG. 4 is a diagram showing a test case manager providing "n" test cases to a plurality of test case executors that execute on separate processors. Test case manager 400 provides test case 0A 410, test case 1A 415, test case 2A 420, and test case 3A 425 to test case executor 430 and test case 0B 411, test case 1B 416, test case 2B 421, and test case 3B 426 to test case executor 440. In turn, test case executor 430 dispatches the test cases to processor A 450 and test case executor 440 dispatches the test cases to processor B 460. During execution, processor A 450 and processor B 460 may communicate with each other, or retrieve information from main memory 480, through bus 470. In one embodiment, test case manager 400 provides a single test case to test case executor 430 and a different test case to test case executor 440.

After each test case execution, test case executor 430 and test case executor 440 perform a register error detection check. For example, after processor A 450 executes test case 0A and processor B 460 executes test case 0B 411, test case executor 430 and test case executor 440 both compute a hardware register error detection check value based upon hardware results from their respective processors, and match the computed values against simulation register error detection check values.

Once processor A 450 finishes executing all of its corresponding test cases at least once, and processor B 460 finishes executing all of its corresponding test cases, test case executor 430 and 440 each performs a memory error detection check comparison against simulation values, and sets an error flag if the comparison values do not match. In turn, test case manager 400 swaps test cases between processor A 450 and processor B 460 for further execution (see FIG. 5 and corresponding text for further details).

Figure 5:
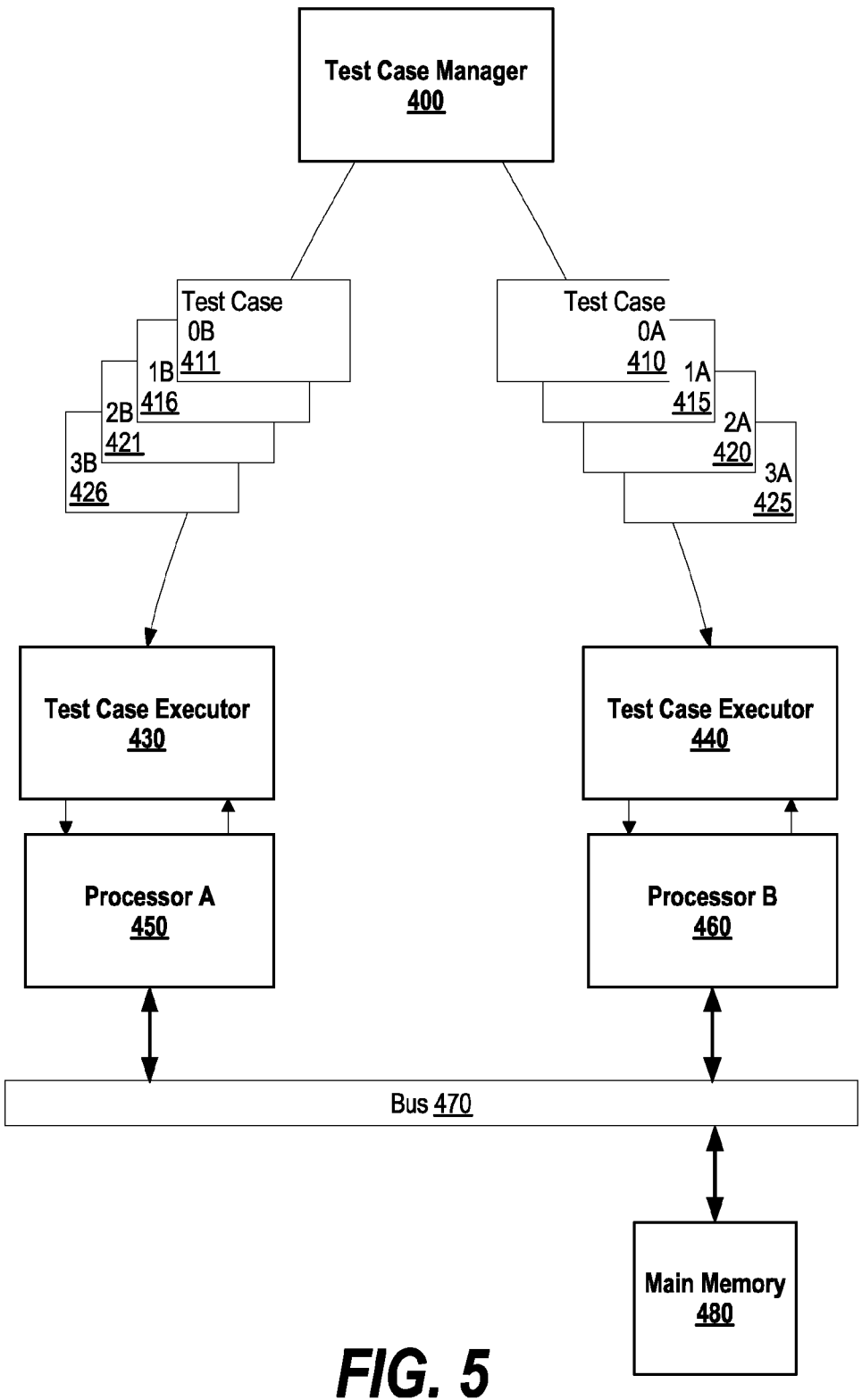
FIG. 5 is a diagram showing a test case manager swapping test cases between homogeneous processors in order to further test the processors.

FIG. 5 is a diagram showing a test case manager swapping test cases between homogeneous processors in order to further test the processors.

FIG. 5 is similar to FIG. 4 with the exception that test case manager 400 loads test cases 0B 411-3B 426 onto test case executor 430, and loads test cases 0A 410-3A 425 onto test case executor 440. As a result, processor A 450 executes test cases 0B 411-3B 426 and processor B executes test cases 0A 410-3A 425, which is opposite of the example shown in FIG. 4.

Figure 7:
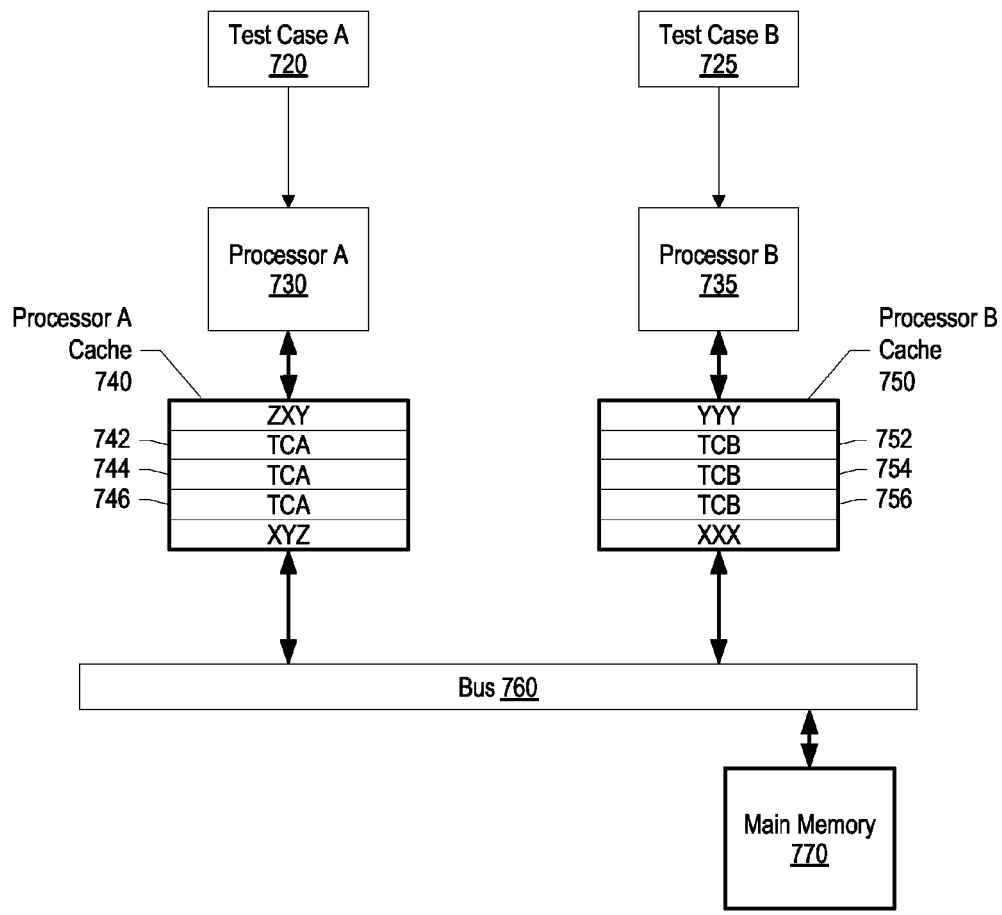
FIG. 7 is a diagram showing processors loading cache line data into corresponding cache lines during test case executions.
Figure 8:
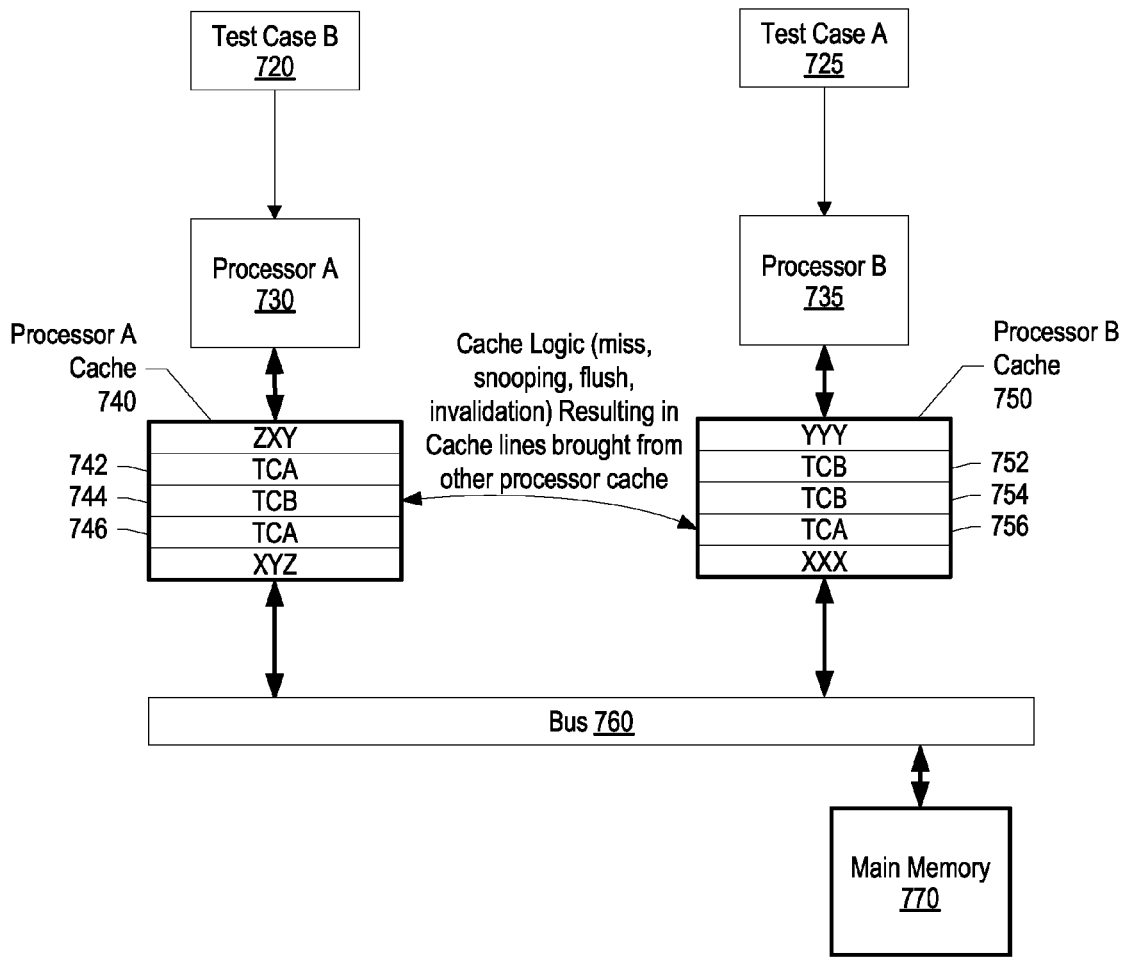
FIG. 8 is a diagram showing cache logic moving cache data between dedicated processor cache as a result of swapping test cases between the processors.

In one embodiment, cache logic loads cache lines dedicated to processor B 460 into cache lines dedicated to processor A 450 (and visa versa) in order for each processor to have access to the most recent cache line data (see FIGS. 7-8 and corresponding text for further details).

FIG. 6 is a table showing a round robin approach to swap test cases between processors. Table 600 includes rows 610-630, which each correspond to a test case rotation round. Table 600 also includes columns 640-660, which each correspond to a particular processor.

As can be seen, during round one (row 610), processor A executes test case 1, processor B executes test case 2, and processor C executes test case 3. After each processor executes their corresponding test case at least once, a test case manager rotates (swaps) the test cases between the processors. Thus, during round two (row 620), processor A executes test case 2, processor B executes test case 3, and processor C executes test case 1.

Again, after each processor executes their corresponding test case at least once, the test case manager rotates (swaps) the test cases between the processors. In turn, during round three (row 630), processor A executes test case 3, processor B executes test case 1, and processor C executes test case 2. As those skilled in the art can appreciate, mechanisms other than a round robin approach may be used to swap test cases between processors.

FIG. 7 is a diagram showing processors loading cache line data into corresponding cache lines during test case executions. Processor A 730 and processor B 735 are homogeneous processors. FIG. 7 shows that test case A 720 loads into processor A 730, and test case B 725 loads into processor B 735.

As processor A 730 executes test case A 720, processor A 730 fetches data from main memory 770 through bus 760 and loads the data into processor A cache 740 (lines 742-746). Likewise, as processor B 735 executes test case B 725, processor B 735 fetches data from main memory 770 through bus 760 and loads the data into processor B cache 750 (lines 752-756).

Each processor may modify their corresponding cache lines during test case execution. As a result, when test cases are swapped between processors and begin to execute, cache logic may move cache line data from one processor's dedicated cache into another processor's dedicated cache in order for the processors to have access to the most recent cache data (see FIG. 8 and corresponding text for further details).

FIG. 8 is a diagram showing cache logic moving cache data between dedicated processor cache as a result of swapping test cases between the processors. Processor A 730 previously executed test case A 725 and processor B previously executed test case B 720 (see FIG. 7). In doing so, each processor retrieved data from main memory 770 and loaded the data into their respective caches 740 and 750. During test case execution, processors A 730 and B 735 modified the data included in caches 740 and 750, respectively.

FIG. 8 shows test case A 725 and test case B 720 are subsequently swapped between processors A 730 and B 735. As processors A 730 and B 735 begin to execute their new test cases, cache logic detects that processor A 730 requires data that was originally in cache line 756, and processor B 735 requires data that was originally in cache line 744. In turn, the cache logic moves data required by test case B 720 from processor B cache 750 into processor A cache 740. The cache logic also moves data required by test case A 725 from processor A cache 740 into processor B cache 750. As a result, processor A 730 is able to sufficiently execute test case B 720 and processor B 735 is able to sufficiently execute test case A 725.

In one embodiment, address translation lines are moved between dedicated translation lookaside buffers (TLB's) similar to data moved between dedicated cache lines as discussed above. In this embodiment, the logic of the TLB's are tested when invalidating and flushing the address translation lines after swapping.

Figure 9:
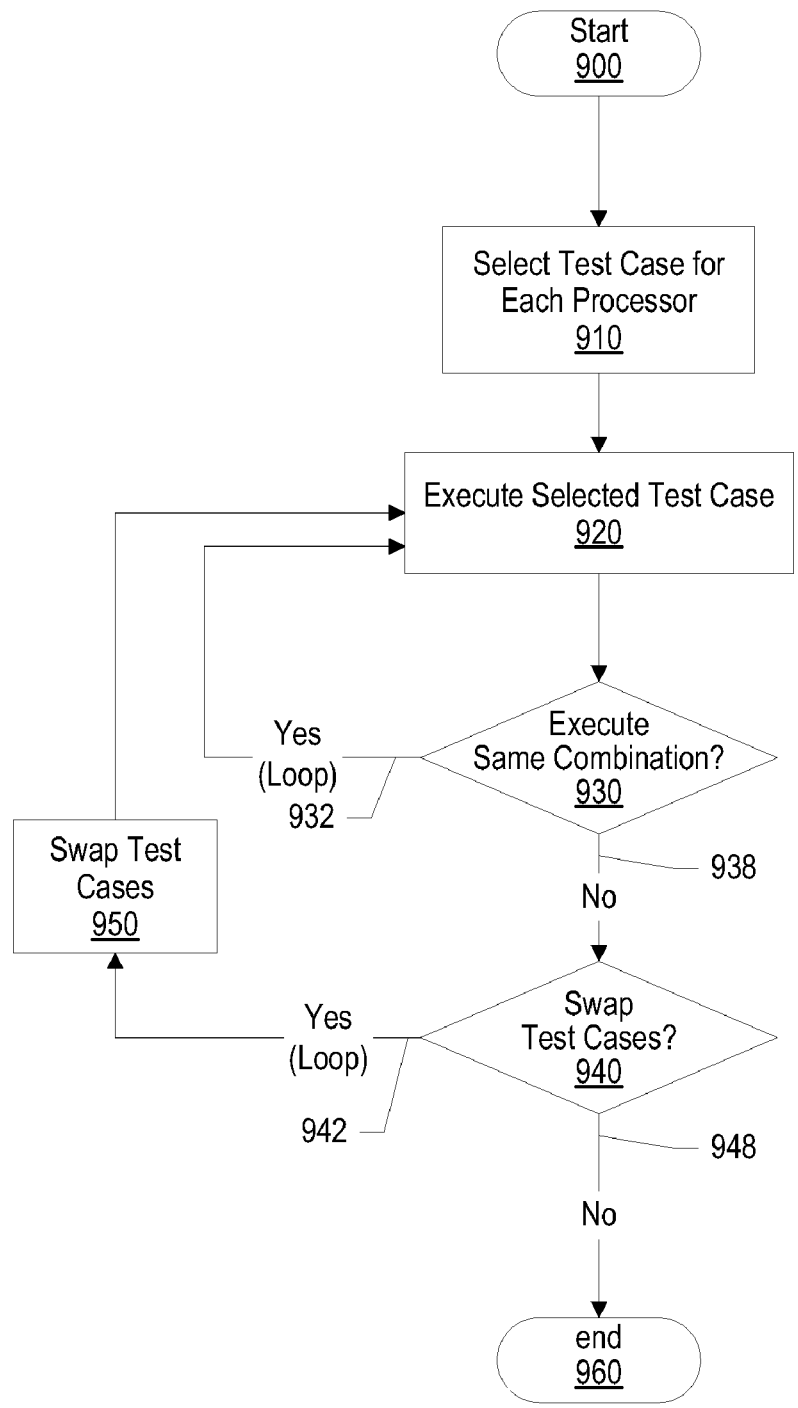
FIG. 9 is a flowchart showing steps taken in swapping test cases between processors that are included in a processor system.

FIG. 9 is a flowchart showing steps taken in swapping test cases between processors that are included in a processor system. Processing commences at 900, whereupon processing selects a test case for each processor included in the system. For example, the system may include four processors, in which case processing selects four different test cases.

At step 910, processing concurrently executes the selected test cases utilizing their corresponding processors. Using the example described above, processing executes the first test case on the first processor, the second test case on the second processor, etc. A determination is made as to whether to execute the test cases on the same processors (decision 930). For example, processing may be configured to execute particular test cases on particular processors for ten iterations in a row.

If processing should execute the test cases on the same processors, processing branches to "Yes" branch 932, which loops back to re-execute the test cases. This looping continues until processing should not execute the test cases on the same processor, at which point decision 930 branches to "No" branch 938.

A determination is made as to whether to swap test cases between processors (decision 940). For example, processing may wish swap test cases in a round robin manner, such as loading the first test case on the second processor, loading the second test case on the third processor, etc. If processing should swap test cases, decision 940 branches to "Yes" branch 942 whereupon processing swaps the test cases (step 950) and executes the test cases on the different processors. On the other hand, if processing should not swap the test cases, decision 940 branches to "No" branch 948 whereupon processing ends at 960.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   selecting a first test case from a plurality of test cases;
   selecting a second test case from the plurality of test cases;
   executing the first test case on a first processor and executing a second test case on a second processor;
   after the executions, loading the first test case on the second processor and loading the second test case on the first processor; and executing the first test case on the second processor and executing the second test case on the first processor.

2. The method of claim 1 wherein the first test case and the second test case execute concurrently.

3. The method of claim 1 further comprising:
during the execution of the first test case on the first processor, loading a first set of data from a main memory into a first cache line in a first cache that corresponds to the first processor;
during the execution of the second test case on the second processor, loading a second set of data from the main memory into a second cache line in a second cache that corresponds to the second processor; and
modifying the first set of data in response to executing the first test case on the first processor and modifying the second set of data in response to executing the second test case on the second processor.

4. The method of claim 3 further comprising:
after loading the first test case on the second processor and loading the second test case on the first processor, detecting the modification of the first set of data and the second set of data;
in response to the detecting, loading the modified first set of data form the first cache line into the second cache and loading the modified second set of data from the second cache line into the first cache.

5. The method of claim 4 wherein the detection is performed by cache logic that is selected from the group consisting of miss logic, snooping logic, flush logic, and invalidation logic.

6. The method of claim 1 further comprising:
selecting a third test case from the plurality of test cases;
executing the third test case on a third processor concurrently with the execution of the first test case on the first processor and the execution of the second test case on the second processor;
invoking a first rotation, wherein the first rotation results in loading the first test case on the second processor, loading the second test case on the third processor, and loading the third test case on the first processor;
after the first rotation, executing the first test case on the second processor, executing the second test case on the third processor, and executing the third test case on the first processor;
invoking a second rotation, wherein the second rotation results in loading the first test case on the third processor, loading the second test case on the first processor, and loading the third test case on the second processor; and
after the second rotation, executing the first test case on the third processor, executing the second test case on the first processor, and executing the third test case on the second processor.

7. The method of claim 6 wherein the first processor, the second processor, and the third processor are homogeneous.

8. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
selecting a first test case from a plurality of test cases;
selecting a second test case from the plurality of test cases;
executing the first test case on a first processor and executing a second test case on a second processor;
after the executions, loading the first test case on the second processor and loading the second test case on the first processor; and
executing the first test case on the second processor and executing the second test case on the first processor.

9. The information handling system of claim 8 wherein the first test case and the second test case execute concurrently.

10. The information handling system of claim 8 wherein the set of instructions performs actions of:
during the execution of the first test case on the first processor, loading a first set of data from a main memory into a first cache line in a first cache that corresponds to the first processor;
during the execution of the second test case on the second processor, loading a second set of data from the main memory into a second cache line in a second cache that corresponds to the second processor; and
modifying the first set of data in response to executing the first test case on the first processor and modifying the second set of data in response to executing the second test case on the second processor.

11. The information handling system of claim 10 wherein the set of instructions performs actions of:
after loading the first test case on the second processor and loading the second test case on the first processor, detecting the modification of the first set of data and the second set of data;
in response to the detecting, loading the modified first set of data form the first cache line into the second cache and loading the modified second set of data from the second cache line into the first cache.

12. The information handling system of claim 11 wherein the detection is performed by cache logic that is selected from the group consisting of miss logic, snooping logic, flush logic, and invalidation logic.

13. The information handling system of claim 8 wherein the set of instructions performs actions of:
selecting a third test case from the plurality of test cases;
executing the third test case on a third processor concurrently with the execution of the first test case on the first processor and the execution of the second test case on the second processor;
invoking a first rotation, wherein the first rotation results in loading the first test case on the second processor, loading the second test case on the third processor, and loading the third test case on the first processor;
after the first rotation, executing the first test case on the second processor, executing the second test case on the third processor, and executing the third test case on the first processor;
invoking a second rotation, wherein the second rotation results in loading the first test case on the third processor, loading the second test case on the first processor, and loading the third test case on the second processor; and
after the second rotation, executing the first test case on the third processor, executing the second test case on the first processor, and executing the third test case on the second processor.

14. The information handling system of claim 13 wherein the first processor, the second processor, and the third processor are homogeneous.

15. A computer program product stored on a tangible computer operable storage medium, comprising functional descriptive material that, when executed by an information handling system, causes the information handling system to perform actions that include:
selecting a first test case from a plurality of test cases;

selecting a second test case from the plurality of test cases;
executing the first test case on a first processor and executing a second test case on a second processor;
after the executions, loading the first test case on the second processor and loading the second test case on the first processor; and
executing the first test case on the second processor and executing the second test case on the first processor.

16. The computer program product of claim 15 wherein the first test case and the second test case execute concurrently.

17. The computer program product of claim 15 wherein the information handling system further performs actions that include:
during the execution of the first test case on the first processor, loading a first set of data from a main memory into a first cache line in a first cache that corresponds to the first processor;
during the execution of the second test case on the second processor, loading a second set of data from the main memory into a second cache line in a second cache that corresponds to the second processor; and
modifying the first set of data in response to executing the first test case on the first processor and modifying the second set of data in response to executing the second test case on the second processor.

18. The computer program product of claim 17 wherein the information handling system further performs actions that include:
after loading the first test case on the second processor and loading the second test case on the first processor, detecting the modification of the first set of data and the second set of data;
in response to the detecting, loading the modified first set of data form the first cache line into the second cache and loading the modified second set of data from the second cache line into the first cache.

19. The computer program product of claim 18 wherein the detection is performed by cache logic that is selected from the group consisting of miss logic, snooping logic, flush logic, and invalidation logic.

20. The computer program product of claim 15 wherein the information handling system further performs actions that include:
selecting a third test case from the plurality of test cases;
executing the third test case on a third processor concurrently with the execution of the first test case on the first processor and the execution of the second test case on the second processor;
invoking a first rotation, wherein the first rotation results in loading the first test case on the second processor, loading the second test case on the third processor, and loading the third test case on the first processor;
after the first rotation, executing the first test case on the second processor, executing the second test case on the third processor, and executing the third test case on the first processor;
invoking a second rotation, wherein the second rotation results in loading the first test case on the third processor, loading the second test case on the first processor, and loading the third test case on the second processor; and
after the second rotation, executing the first test case on the third processor, executing the second test case on the first processor, and executing the third test case on the second processor.

* * * * *